July 18, 1961  W. T. RENTSCHLER  2,992,600
PHOTOGRAPHIC INTRA-LENS SHUTTER AND COUPLED EXPOSURE DEVICE
Filed June 22, 1956  2 Sheets-Sheet 1
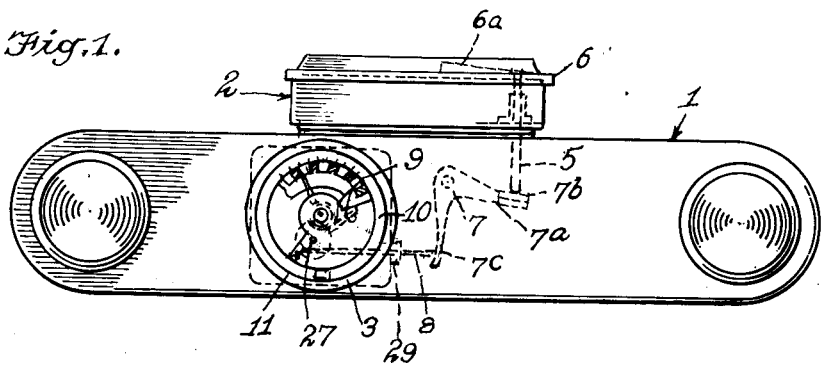
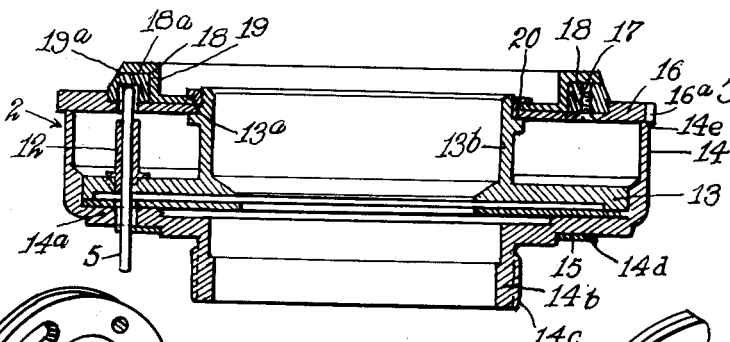
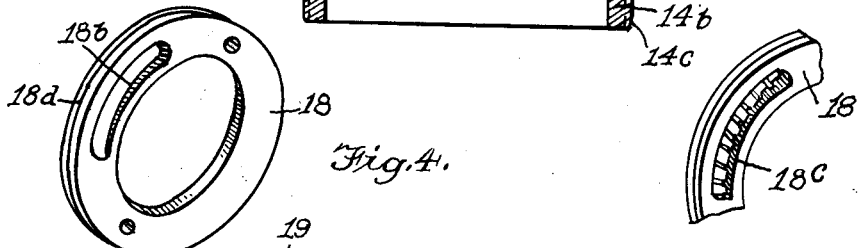
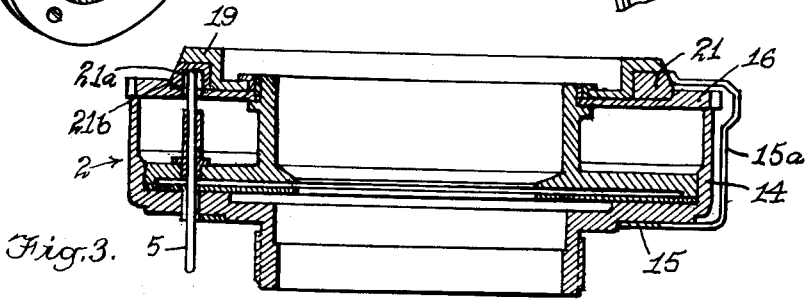
INVENTOR.
Waldemar T. Rentschler
BY
Munn, Liddy, Nathanson + March
ATTORNEYS July 18, 1961 W. T. RENTSCHLER 2,992,600
PHOTOGRAPHIC INTRA-LENS SHUTTER AND COUPLED EXPOSURE DEVICE
Filed June 22, 1956 2 Sheets-Sheet 2
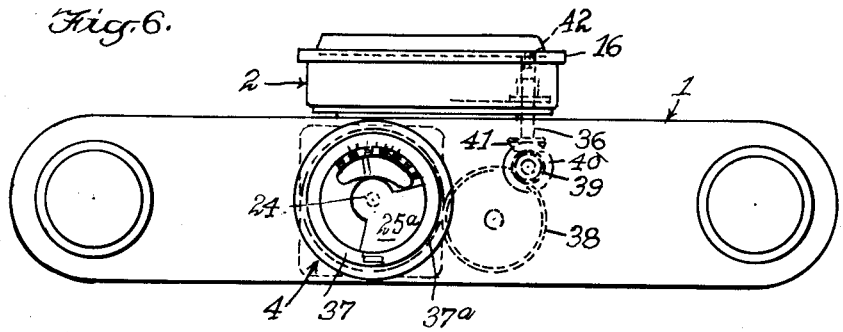
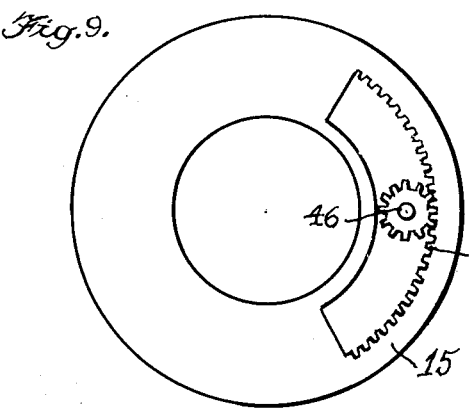
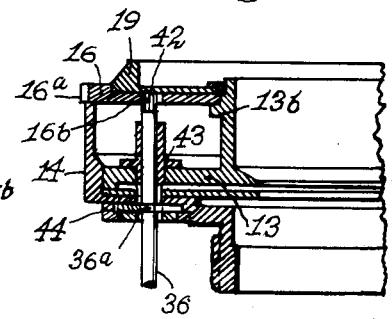
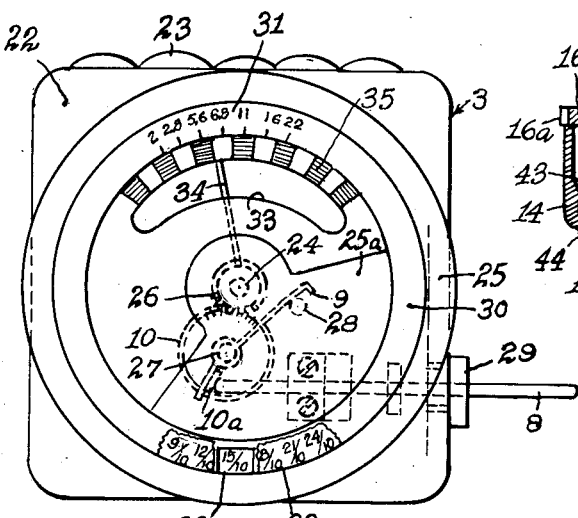
INVENTOR.
Waldemar T. Rentschler
BY
Munn, Liddy, Nathanson & March
ATTORNEYS

United States Patent Office 2,992,600
Patented July 18, 1961

2,992,600
PHOTOGRAPHIC INTRA-LENS SHUTTER AND COUPLED EXPOSURE DEVICE
Waldemar T. Rentschler, Calmbach (Enz), Germany, assignor to Alfred Gauthier G.m.b.H., Calmbach (Enz), Germany, a corporation of Germany
Filed June 22, 1956, Ser. No. 593,134
Claims priority, application Germany July 7, 1955
17 Claims. (Cl. 95—10)

This invention relates to photographic cameras, and more particularly to cameras of the type having intra-lens shutters and exposure devices coupled thereto.

Heretofore various types of intra-lens shutters and coupled exposure devices have been proposed and constructed. However, these prior organizations have all been characterized by the employment of a relatively large number of additional components, requiring appreciable space on the camera. Also, such prior organizations have involved a relatively high expense, and accordingly have not been entirely satisfactory.

The present invention obviates the drawbacks of these prior, coupled intra-lense shutters and exposure devices which require appreciable space and a large number of components, entailing quite some expense, and one object of the invention is to provide in a photographic camera a novel and improved intra-lens shutter and coupled exposure device which may be contained in small available space, and which is characterized by an extremely simple structure involving relatively few, non-com plicated components.

A further object of the invention is to provide an improved shutter and coupled exposure device in accordance with the above, which is simple to assemble and economical to fabricate, thereby enabling the selling price of the camera to be kept relatively low while still providing the advantages of automatic and reliable operation.

In accomplishing the above objects the invention provides, in the various embodiments thereof illustrated and described herein, a simple turnable or shiftable part projecting into the interior of the shutter or shutter housing, said part being preferably movably carried or borne in a guide bushing disposed parallel to the shutter axis. This turntable or shiftable part is connected either by gear or cam means with either the diaphragm setting member or the exposure-time setting member, and also by similar means with a setting member of the exposure device whereby a reliable and effective coupling is established having the advantages of simplicity, ease of fabrication and assembly, and utilization within the shutter and camera structure of space already available and not heretofore utilized.

Other features and advantages will hereinafter appear.

In the drawings accompanying this specification, similar characters of reference indicate corresponding parts wherever possible in the several views, in which:

FIGURE 1 is a top plan view of a photographic camera having an intra-lens shutter and an incorporated exposure device, there being provided between the shutter and exposure device an improved and simplified, cam-type coupling means in accordance with the invention.

FIG. 2 is an axial sectional view through the intra-lens shutter of FIG. 1, showing an axially shiftable driving pin disposed within and extending through the shutter housing. In FIG. 2 the axially movable pin is influenced by settings of the exposure time setting member of the shutter.

FIG. 3 is a view like FIG. 2, but with the axially movable pin influenced by settings of the diaphragm setting ring.

FIG. 4 is a perspective view of a cam ring such as may be employed in the structures of FIGS. 1–3, to axially shift the said movable pin, said ring having a smooth cam surface.

FIG. 5 is a fragmentary perspective view of a cam ring similar to that FIG. 4, but illustrating a stepped type of cam surface.

FIG. 6 is a top plan view of a camera similar to that of FIG. 1, but illustrating another form of coupling means between the intra-lens shutter and the exposure device.

FIG. 7 is a fragmentary axial sectional view taken through the intra-lens shutter of FIG. 6, and showing details of the turnable coupling part extending through the shutter housing, said part being engaged with the exposure time setting ring of the shutter.

FIG. 8 is a fragmentary axial sectional view similar to that of FIG. 7, but showing the turnable shaft coupled to the diaphragm setting ring of the camera.

FIG. 9 is a rear elevational view of the intra-lens shutter of FIG. 8, showing the diaphragm setting ring geared to turn the shaft of FIG. 8.

FIG. 10 is a top plan view of an exposure device such as that shown in FIG. 1, together with a portion of the coupling means therefor as provided by the invention.

Referring to FIGS. 1, 2 and 4, there is illustrated a camera 1 having an intra-lens shutter 2 incorporated in it, in the usual manner. The camera 1 has an exposure device or meter indicated generally by the numeral 3, said device having the usual, light-sensitive cell and instrument movement by which indications are given of the strength of the light falling on the subject to be photographed.

In accordance with the present invention I provide a novel and improved, extremely simple coupling means between either the diaphragm setting member or the exposure-time setting member of the shutter 2 and the setting member of the exposure device 3, said coupling means being wholly contained within the shutter 2 and camera 1, and being accommodated in space already available therein. The improved coupling means of this invention is characterized by either a turnable or axially shiftable elongate part disposed in an elongate bearing means arranged parallel to the shutter axis, such part being connected respectively by either gear or cam means with the diaphragm setting member or the exposure time setting member, and being further connected by similar means with the setting member of the exposure device.

As shown, this improved coupling means comprises an axially movable or shiftable pin 5 extending into the shutter 2 and being adapted at its front end to engage a driving element or cam 6a carried by a cam ring 6. It will be seen that the ring 6 as shown in FIG. 1 is concentrically disposed at the front of the shutter 2, and the numeral 6 is intended to broadly designate either of several different types of cam rings which will be specifically described and pointed out hereinafter.

Within the casing of the camera 1 there is disposed an angular lever 7 which is coupled, as will be hereinafter described, to cause turning movement of a setting disk indicated generally by the numeral 11 in FIG. 1, forming part of the exposure device 3. The designation 11 of the setting disk is a general one, and where the exposure device is later explained in detail in connection with the showing of FIG. 10, the setting disk will be given another and specific designation. In FIG. 1 the coupling means between the lever 7 and disk 11 includes an axially shiftable pin 8 carried by the exposure device 3, and also a spur gear 10 in said device, spring loaded by a spring 9.

Referring to FIG. 2, the axially shiftable pin 5 is carried in a guide bushing 12 which is shown as fixed on the usual shutter base plate 13. It will be readily understood that the bushing 12 may be mounted on the bottom wall 14a of the shutter housing 14 instead of on the base plate 13, if desired.

It will be further understood that the construction of the shutter housing 14 and base plate 13, except for the aforementioned mounting of the bushing 12, is of the usual type. At the rear of the housing 14, for example, there is arranged a nozzle 14b for holding lenses, said nozzle having external screw threads 14c by which it may be screwed into the camera 1. The housing 14 has an annular shoulder 14d against which there is disposed a diaphragm setting ring 15. At the front of the housing 14 there is carried an exposure time setting ring 16 engaging a front edge 14e of the housing side wall. The base plate 13 has a nozzle 13b provided with a shoulder 13a which functions as a bearing for the exposure time setting ring 16, and such nozzle may also be used for holding the usual camera lenses.

By this invention, adjacent and secured to the exposure time setting ring 16 there is provided a cam ring 18, FIGS. 2 and 4, having a driving element in the form of a sloping cam surface 18a adapted to engage the axially shiftable pin 5 and drive the same. The cam surface 18b may be smooth as shown in FIG. 4, or it may be stepped as shown in FIG. 5.

It will be understood that with such a construction, turning of the exposure time setting ring 16 will result in the pin 5 being shifted downward as viewed in FIG. 2, and when as in the present instance the pin 5 is spring biased upward (as will be later brought out) the pin will also shift axially upward in response to reverse turning of the ring 16. It will be noted that axial movement of the pin 5 is parallel to the axis of the shutter 2.

Where the turning of the exposure time setting ring 16 involves a constant change of exposure times, the cam ring 18 having the smooth cam surface 18b is employed, and where the exposure times are to be adjusted to certain fixed or stepped values, the cam ring 18 with the stepped cam surface 18c will be employed.

The shutter 2 has a front plate 19 provided with a conically-surfaced mantle 19a, said front plate being secured to the nozzle 13b by means of a retainer ring 20. To provide an unbroken surface and a finished appearance, the outer periphery 18d of the cam ring 18 is made conical and so as to constitute a continuation of the conical surface of the front plate 19.

Before explaining the remainder of the coupling means as provided by the invention between the pin 5 and the exposure device 3, it is desired to point out that the said pin may be axially shifted by setting of the diaphragm setting ring 15 instead of by movement of the exposure time setting ring 16, and such organization is illustrated in FIG. 3. In this figure there is provided, in place of the cam ring 18 fastened to the exposure setting ring 16, a cam ring 21 which is not rigid with the ring 16 but instead turnable with respect thereto. The cam ring 21 has a driving element in the form of a cam surface 21a which may correspond to either of the cam surfaces 18b or 18c shown in FIGS. 4 and 5. The cam ring 21 is rigidly connected to the diaphragm setting ring 15 by means of a U-shaped arm 15a extending between the said rings and disposed at the exterior of the shutter housing 14. It will be understood that with this organization turning of the diaphragm setting ring 15 in opposite directions will cause opposite axial movements of the shiftable pin 5, similar to those occurring in response to opposite turning of the exposure time setting ring 16.

By the above organizations I am enabled to effect in an extremely simple manner and with relatively few components, an advantageous and desirable coupling between the exposure meter 3 and either of the rings 15 and 16. Such coupling means includes as an essential element or member the movable pin 5 which, as explained hereinabove, may be axially shiftable, and which as will be hereinafter explained, can also utilize a rotary or turning movement. The pin 5 may be incorporated in the shutter 2 after complete assembly of the latter and only shortly before the shutter is mounted on the camera. The controlling means for the pin 5, comprising the cam rings 16, 18 and 21, are of extremely simple construction, may be simply produced, and operate in a simple and reliable manner. Moreover, the cam rings do not affect, and require no alteration whatsoever of, the existing shutter mechanism. Since the rings are annular, the cam surfaces thereof may be disposed in a circumferential location where there is space available for the bearing bushing 12 and the pin 5, so that the pin may pass through the plane of movement of the shutter blades as well as the plane of movement of the diaphragm blades. Often several suitable locations are available, in any given and well known photographic structure.

Thus, by the present invention, a coupling is provided as hereinbefore set forth, which may be incorporated in virtually all well known shutters without requiring rearrangement of the basic shutter structures.

Moreover, not only is it unnecessary to change the interior shutter structure to incorporate this coupling means, but also no changes whatsoever are necessary exteriorly of the shutter, and the external shutter dimensions therefore may remain substantially constant. No appreciable space is required at the exterior of the shutter housing, as will be readily appreciated.

Moreover, the incorporation of the cam rings in the shutter has no material effect on the external appearance of the shutter, or on the appearance and functioning of the time exposure setting ring or the diaphragm setting ring.

The transmission of movement from the axially movable pin 5 to the exposure device 3 as accomplished by the angular lever 7 results in the utmost simplicity and dependability. Depending on the available space in the camera 1, only one or several levers need be employed. A single lever is illustrated in FIG. 1, the lever 7 shown therein having a plane of movement disposed generally at the height of the view finder window of the camera. The lever 7 has one arm 7a provided with a vertically extending bent lug 7b adapted to engage and cooperate with the end of the pin 5. By virtue of the bent lug 7b there is accommodated the difference between the planes of movement of the pin 5 and the lever 7.

Another arm 7c of the lever 7 is adapted to engage the axially shiftable pin 8 disposed at the exposure meter 3. The pins 5 and 8 and the lever 7 thus constitute an extremely simple, complete force-transmission means between the shutter 2 and the exposure device 3.

Referring to FIG. 10, the exposure device 3 may have a housing 22 provided with a honeycomb window 23 through which light may pass to a photo-element disposed at the interior of the housing and not shown, said photo-element supplying current for an instrument movement forming part of the exposure device. The housing 22 has an axis 24 which rotatably carries a carrier segment 25a in turn supporting a turnable setting disk 25 corresponding to the disk generally designated by the numeral 11 in FIG. 1. The segment 25a is connected with a spur gear 26 meshing with the gear 10 which is carried by an axis 27. The gear 10 has a stop or abutment member 10a engaged by one end of the spring 9, the other end of said spring being supported against a pin 28 fixed on the housing 22. It will thus be seen that the setting disk 25 is under the influence of the spring 9, which tends to turn the disk 25 clockwise. The shiftable pin 8 is carried in a guide bushing 29 and has one end adapted to engage the stop 10a of the gear 10.

The setting disk 25 carries a ring 30 which is rotatable or shiftable on the disk and may be held thereon in different adjusted positions. The ring 30 may have a scale provided with either diaphragm values or exposure time values. In FIG. 10, the scale 31 of the disk 30 is shown as having diaphragm values.

The ring 30 also has a window 30a revealing a portion of the disk 25, and the latter may have a film sensitivity scale 32 which is visible one figure at a time through the window 30a. The exposure meter also has a window 33 through which the pointer 34 of an electrical instrument movement is visible. For the purpose of orienting the needle point with the scale 31, a channel scale 35 may be provided, extending between the window 33 and the inner diameter of the ring 30.

Operation of the improved coupling device of this invention is as follows: The settable ring 25 of the exposure device is positioned to bring the proper film sensitivity figure in the window 30a, for the film that is being used. Depending on whether the coupling means is connected with the diaphragm setting ring 15 or the exposure time setting ring 16, one or the other of said rings is adjusted at the shutter to the desired value. This will actuate the pin 5, lever 7, pin 8, gears 10 and 26, disk 25 so as to cause the latter to correspond automatically to the chosen setting at the shutter. Then the needle 35 of the exposure device is read on the scale 31, such reading indicating what the setting should be of the remaining setting ring, whether it be the diaphragm setting ring or the exposure time setting ring (whichever was not initially adjusted for the prevailing conditions). The camera is then properly set for taking the picture.

Another embodiment of the invention, wherein the coupling part is turnable instead of axially movable, is shown in FIGS. 6 and 7. Parts in these figures which are similar to those already described have been given like characters wherever possible.

In FIG. 6 there is provided a shaft 36 extending into the housing or the shutter 2, for actuation by the exposure time setting ring 16 of the shutter. The exposure meter 4 shown in FIG. 6 has a setting disk 37 corresponding to the setting disk 25 of FIG. 10, the disk 37 having external gear teeth 37a meshing with a spur gear 38 which also meshes with a pinion 39 attached to a bevel gear 40. The latter meshes with a second bevel gear 41 carried by the shaft 36. In FIG. 6 there is not needed the pin 8, spring 9 and gears 10 and 26 shown in FIG. 10; instead, the segment 25a carrying the disk 37 is rigidly mounted on the axis or shaft 24.

Referring to FIG. 7, the shaft 36 has a pinion 42 meshing with internal gear teeth 16b of the exposure time setting ring 16. Preferably the diameter of the pinion 42 is the same as the outside diameter of the shaft 36 thereby to enable to shaft to be slid axially into the shutter housing from the rear thereof, for purposes of ease of assembly.

The shaft 36 is carried in a bearing bushing 43 which corresponds with the bearing bushing 12 shown in FIG. 2. To secure the shaft 36 in its axial position it is provided with a groove 36a adapted to receive a locking plate 44 which is fixed to the rear of the shutter housing 14, as by suitable screws.

In accordance with the above structure the exposure time setting ring 16 is coupled to the setting disk 37 for simultaneous movement therewith.

An organization providing for simultaneous movement of the setting disk 37 and the diaphragm setting ring 15, along the lines of the disclosure of FIG. 6, is illustrated in FIGS. 8 and 9. As shown, the diaphragm setting ring 15 has a driving element in the form of internal gear teeth 15b meshing with a pinion 46 carried on a shaft 45. The shaft 45 bears in a bushing 43, as shown, and is secured against axial movement by a locking plate 44 as already explained. Thus, turning of the diaphragm setting ring 15 will effect turning of the shaft 45, which may then be coupled to the setting disk 37 through the medium of gearing such as the gears 41, 40, 39, 38 and 37a shown in FIG. 6.

It will be readily understood that the operation of setting the camera with the embodiments of the invention shown in FIGS. 6–9 is the same as already described above. In addition, it will be seen that instead of manipulating either the exposure time setting ring 16 or the diaphragm setting ring 15 at the shutter, the user may manipulate directly the setting disk 37 of the exposure device, since a reversible drive is established between said disk and the aforementioned rings.

It will be further understood that a suitable coupling or clutch means may be readily provided between the exposure time setting ring 16 and the diaphragm setting ring 15 whereby these may be adjustably related to each other according to certain conditions as determined by the user of the camera. When this is done, then a combined adjusting of the rings 15 and 16 may be simultaneously effected merely by actuation of the setting disk 37. Such coupling or clutch devices between the rings 15 and 16 are already known and accordingly have been omitted for the sake of clarity. It will be understood that such a clutch will be effective only for purposes of a combined adjustment, and the operator will always remember when changing the light conditions that he must be guided by the instrument pointer 34 to establish the proper relationship between the rings 15 and 16.

The various embodiments of the invention illustrated herein have in common an extremely simple and effective coupling means characterized by a turnable or axially shiftable part such as the shafts 5 or 36. Operation of such part by either the exposure time setting ring 16 or the diaphragm setting ring 15 is carried out in a surprisingly simple way. By virtue of the part extending through the shutter housing 14 there is an opportunity to provide a long bearing surface, obviating the need for special bearings within the camera itself. Thus there is obtained great simplicity and economy of manufacture.

Additionally, since the coupling means is independent of the real shutter assembly, the handling of the shutter prior to its mounting on the camera is facilitated.

Variations and modifications may be made within the scope of the claims and portions of the improvements may be used without others.

I claim:

1. In a camera, the combination of a photographic intralens shutter having a housing enclosing the shutter-actuating mechanism and having a settable member carried by the housing; a driving element disposed wholly within the housing and accessible from the housing interior; said element being rigid and movable with said settable member; an exposure meter carried by the camera and having an indicator needle and a settable member, said last mentioned settable member having a scale thereon for coaction with said needle, means coupling said settable members to each other for concurrent movement, said means including an elongated guide bushing extending into said housing and having its axis substantially parallel to the shutter axis and further including a part axially shiftable in said bushing, and projecting into the interior of the shutter housing, said part being connected internally of said camera with said driving element in the housing and with the settable member of said exposure meter.

2. The invention as defined in claim 1 in which the said part which is axially movable in the bushing constitutes a cam follower, and in which the driving element in the shutter housing includes a cam engageable with said part for actuating the same.

3. The invention as defined in claim 2 in which the shutter has an exposure-time setting ring and a front plate disposed ahead of said ring, in which the cam comprises a ring disposed between the front plate and exposure-time setting ring, and in which the shutter has a diaphragm setting ring connected with the said cam ring.

4. The invention as defined in claim 3 in which the front plate and cam ring have exterior conical surfaces which constitute continuations of each other.

5. The invention as defined in claim 1 in which the said movable part is turnable in the bushing and is rotated by the driving element in the shutter, in which the settable member of the exposure meter comprises a turnable disk having external gearing, and in which there is a gear train between said external gearing and the said movable and turnable part.

6. The invention as defined in claim 5 in which the turnable disk has a film sensitivity scale, and in which there is a shiftable and adjustable ring carried by the disk and having index means cooperable with said scale.

7. The invention as defined in claim 6 in which the shiftable ring is provided with indicia relating to camera settings affecting the exposure of the film.

8. The invention as defined in claim 1 in which there are means including a lever mechanism connected with the said movable part, for coupling the same to the exposure meter.

9. The invention as defined in claim 8 in which the lever mechanism comprises a single angular lever.

10. The invention as defined in claim 2 in which the cam has a smooth, stepless surface.

11. The invention as defined in claim 2 in which the cam has a stepped surface.

12. The invention as defined in claim 2 in which the part movably carried by the bushing comprises a cylindrical pin at one end engaging the said cam.

13. The invention as defined in claim 2 in which the shutter has an exposure-time setting ring and a front plate disposed ahead of said ring, and in which the cam comprises a ring disposed between the front plate and exposure-time setting ring and connected to the latter, said front plate and cam ring having exterior conical surfaces constituting continuations of each other.

14. The invention as defined in claim 1 in which the movable part comprises a turnable shaft, and in which there is means at the rear of the shutter housing, for holding said shaft against axial movement.

15. The invention as defined in claim 1 in which the settable member of the exposure meter comprises a turnable setting disk, and in which there is a spring for loading said disk, said disk following the movement of the said movable part.

16. The invention as defined in claim 1 in which the settable member of the housing comprises an exposure-time setting member, in which the movable part comprises a turnable shaft, in which there are meshing external and internal gears on one end of said shaft and on the driving element rigid with the exposure-time setting member respectively, in which there is another gear on the other end of the shaft, and in which there is a chain of gears connected between said other gear and the settable member of the exposure meter.

17. The invention as defined in claim 1 in which the settable member of the housing comprises a diaphragm setting ring, in which the movable part comprises a turnable shaft, in which there are meshing gears on one end of said shaft and on the driving element rigid with the diaphragm setting member, in which there is another gear on the other end of the shaft, and in which there is a chain of gears connected between said other gear and the settable member of the exposure meter.

References Cited in the file of this patent

UNITED STATES PATENTS

| | | |
|---|---|---|
| 2,252,573 | Leitz et al. | Aug. 12, 1941 |
| 2,305,294 | Kuppenbender | Dec. 15, 1942 |
| 2,612,091 | Weiss | Sept. 30, 1952 |

FOREIGN PATENTS

| | | |
|---|---|---|
| 756,282 | Germany | Feb. 23, 1953 |